United States Patent [19]

Edwards

[11] Patent Number: 4,714,334

[45] Date of Patent: Dec. 22, 1987

[54] METHOD OF COLOR PHOTOGRAPHY OF BLACK AND WHITE OBJECT

[76] Inventor: Clarence C. Edwards, 4256 E. Capitol St., Washington, D.C. 20019

[21] Appl. No.: 935,639

[22] Filed: Nov. 25, 1986

Related U.S. Application Data

[63] Continuation of Ser. No. 895,901, Aug. 12, 1986.

[51] Int. Cl.⁴ ..................... G03B 17/50; G03B 29/00
[52] U.S. Cl. ........................... 354/76; 354/86; 355/27; 355/77; 430/206; 430/357; 430/404
[58] Field of Search .................. 354/76, 83, 84, 85, 354/86, 87, 304; 355/27, 39, 40, 44, 45, 64, 65, 75, 77, 21; 430/404, 405, 206, 357; 128/660; 378/100, 183, 210

[56] References Cited

U.S. PATENT DOCUMENTS

| | | | |
|---|---|---|---|
| 3,396,649 | 8/1968 | Bishop et al. | 355/21 |
| 3,451,321 | 6/1969 | Raia et al. | 355/64 |
| 3,473,873 | 10/1969 | Brackett | 355/40 |
| 3,608,454 | 9/1971 | Shenk | 354/86 |
| 3,696,720 | 10/1972 | Vinson | 354/76 |
| 4,191,962 | 3/1980 | Sramek | 354/76 |
| 4,199,250 | 4/1980 | Durand | 355/39 |
| 4,341,454 | 7/1982 | Baker et al. | 354/86 |

*Primary Examiner*—A. A. Mathews
*Attorney, Agent, or Firm*—Irvin A. Lavine

[57] ABSTRACT

A method is provided for producing a photographic image in color of a continuous tone, e.g., black and white object, such as a black and white photograph or an X-ray. Instant color film of the type having emulsions developed in timed sequence after exposure to a developer, and a separable sheet carrying the developer is used. The object is exposed onto the film, the developer is activated, and the developer sheet is separated, perferably prior to development of all of the emulsions. The resulting color photographic image may be reproduced.

8 Claims, 7 Drawing Figures

METHOD OF COLOR PHOTOGRAPHY OF BLACK AND WHITE OBJECT

CROSS REFERENCE TO RELATED APPLICATION

This application is a continuing application of Application Ser. No. 895,901 filed Aug. 12, 1986.

BACKGROUND OF THE INVENTION

This invention relates to color photography.

Many images, particularly those of a technical nature, are continuous tone—i.e., black and white images. These images include, for example, black and white photographic images in various technical works, such as medical books and journals. The photographic images are usually derived from photography, sonography and radiography (X-rays) processes and equipment.

The above-discussed images are all of the type known as "gray continuous tone images", varying between black and white at different portions of the image. The analysis of such images requires significant training in order that the information contained in them may be understood and interpreted. Interpretation is recognized as being somewhat subjective, and in many cases, presents substantial difficulties.

It has been recognized that the human eye has relatively poor gray scale performance; that is, the eye cannot discriminate over as wide a range of intensity level as is desirable in order to assist in the interpretation and understanding of continuous tone images. Recognition of the foregoing fact has led to the development of color coded images, which has been accomplished with complex electronic equipment in, for example, certain oscilloscopes which produce images sensed by radar equipment. Other examples of such equipment where color enhancement is achieved of a black and white image through such electronic equipment is in the area of sonography. In these examples, a color is arbitrarily assigned to each small range of magnitude of the received radar pulse or the received ultrasonic pulse echo. The color coding of oscilloscopes is most successful with relatively simple images having few details and slowly varying intensities, if any.

Color photography is widely used and, in the medical and other technical fields, the provision of color photographs of multicolor objects has been effective as data for conveying information for instructional and diagnostic purposes. The provision of full color photographs in printed material, such as text books and scientific journals is, however, substantially more expensive than with black and white photographs. The result is that some such publications are printed in black and white only for purposes of economy, with attendant loss in the information actually conveyed to the reader.

SUMMARY OF THE INVENTION

The present method provides for the production of photographs in color of a continuous tone or black and white image through the use of commercially available color film of the instant film type. Among the instant color films which are commercially available is a film having a support with plural emulsion layers, each receptive to a particular primary color. The emulsions are developed in time sequence by a developer. The developer is carried on a separable sheet which is initially a part of the color film assembly. This type of color film is exposed so as to receive the image of a continuous tone object. The developer is activated in the normal way by ejection of the color film assembly from the camera and development is halted by separating the separable sheet from the film which includes the support and the emulsions. The separation may occur in many instances prior to the development of all of the emulsions, so that the resulting photograph may contain less than all of the colors which would be provided if all of the emulsions were developed. The resulting color photograph of the continuous tone or black and white object may then be reproduced by conventional processes, as in the production of a book or journal.

Among the objects of the present invention are the provision of a color photograph from a black and white object, the provision of a color photograph of a desired color of a black and white object to provide photographic enhancement, and to provide for economic reproduction of a color photograph of a continuous tone object.

DESCRIPTIONS OF THE PREFERRED EMBODIMENTS

In accordance with the present invention, use is made of so-called "instant color film". Such a film typically has a plurality of layers, each containing an emulsion sensitive to a particular color, such as blue, green and red. There is provided in association with the film a developer sheet containing developer(s) for the emulsions, the developer being in, for example, micro-capsules which are ruptured by pressure. In normal usage, after an image has been exposed, a film "print" is removed or ejected from the camera, the action causing rupturing of the micro-capsules, which then develops the various emulsions. The developer sheet is detachable or separable and development is typically completed in approximately sixty seconds after initiation by removal from the camera, at 75° F. At that time, a sheet containing the developer is removed from the "print" to provide a photographic print in substantially full color. Because the print is available immediately after the exposure of the film, it is called "instant film".

A characteristic of the film above-described is that the development of the emulsions is sequentially timed. That is, certain emulsions are developed within, for example, the first five seconds after the developer is released, and other emulsions complete their development at other times from initiation of color development.

Figure 1:
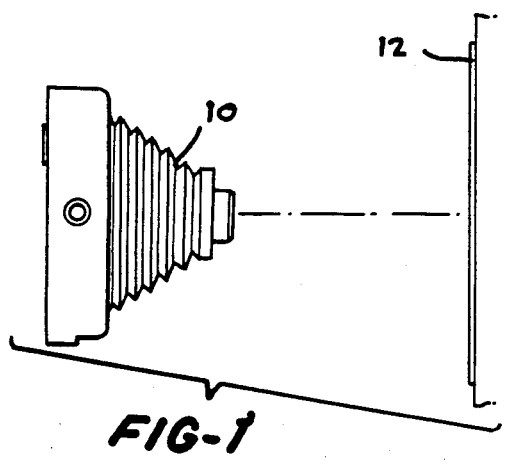
FIG. 1 is a schematic view illustrating the photographing of an object using instant color film.

Referring now to the drawings, FIG. 1 provides, in schematic form, an illustration of an instant camera 10 directed so as to take a photograph of an object 12. The object may be, preferably, one which provides a continuous tone image. Examples of such objects are a black and white photograph, an oscilloscope display and an X-ray film. Thus, in the first step, the object 12 is photographed by imparting its image onto photographic film of the type above specified or similar, within the camera 10.

Figure 2:
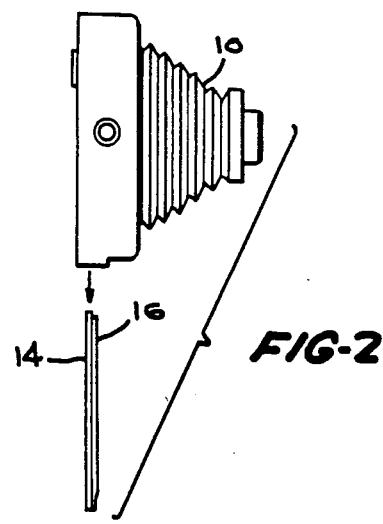
FIG. 2 is a schematic illustration of color film discharged from a camera.
Figure 3:
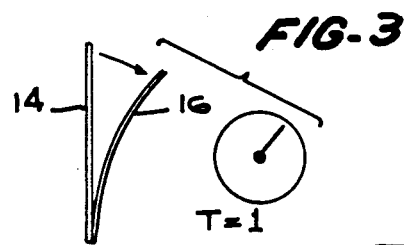
FIG. 3 is a schematic illustration of a development sheet being separated from the color film after a particular time.

FIG. 2 illustrates the second step in which there is removed or ejected from the camera 10 a first instant color film 14 having a separable developer-carrying sheet 16 associated with it. In FIG. 3, there is illustrated the removal or separation of the developer sheet 16 from the film 14, at a time T=1 after initiation of development.

Figure 4:
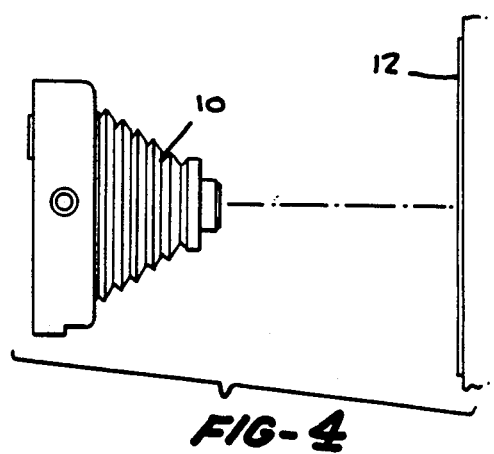
FIG. 4 is a schematic representation of a second color film being exposed to the image of the same object.
Figure 5:
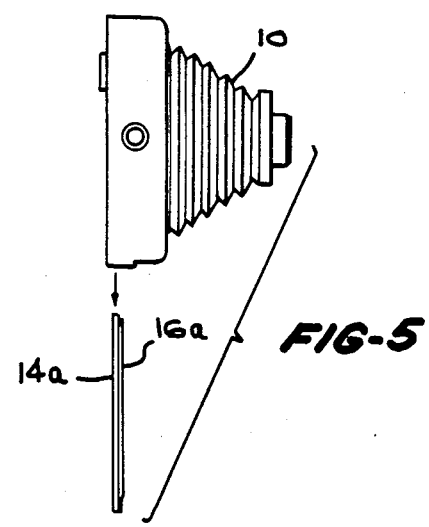
FIG. 5 is a schematic view showing the color film removed from the camera.
Figure 6:
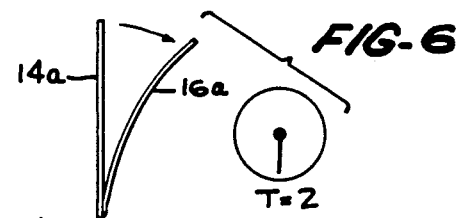
FIG. 6 is a schematic view showing the separation of a developer sheet from the color film.

FIG. 4 illustrates the photographing of the object 12 with the camera 10 in the same manner as in FIG. 1. FIG. 5 illustrates the step of the ejection or removal from camera 10 of another film 14a having a separable developer sheet 16a. As shown in FIG. 6, after a development time T=2, different from time T=1, the separable developer sheet 16a is removed from the film 14a.

As a result of the foregoing steps, there will be produced two color prints 14 and 14a, which have had their developments stopped at different times. As a result, the two instant color prints 14 and 14a will have different colors as discussed hereinbelow. The two prints 14 and 14a are then placed adjacent each other and viewed. The prints 14 and 14a will be of the same object, but will display that object in different colors due to the different development times permitted, at least one of which is for a lesser time than the full development time of the film used.

There are preferably used, in performing the steps as hereinabove discussed, such film as POLAROID Type 669 or POLAROID Type 668. Both of these films are commercially available, providing eight individual films 14, 14a, etc. with developer sheets 16, 16a, etc. in a single film pack. Thus, after ejection or removal of one such film and sheet from the camera, the next film of that pack is automatically placed in position for use and exposure.

Using standard POLAROID Type 669 film, and with an oscilloscope having positive polarity, that is, with the background light, development was stopped after five seconds; the image was a pale blue and the background was ivory/white. A second exposure on another POLAROID Type 669 film was permitted to develop for approximately fifteen seconds, and resulted in the image being a magenta-blue with the background being a light blue. At twenty seconds development time of the next exposure, the image was a darker blue, with portions in varying shades, and the background remained a light blue. Development of other exposures for increasing amounts of time had little change on the background, while at thirty seconds, the image was deep blue, approaching black in some parts, and with subsequent exposures developed for greater than approximately 35 seconds, there was little change in the color of the image.

On oscilloscopes where there is polarity-reversal, the background can be changed to be dark, instead of light, as occurs with a positive polarity image on the oscilloscope. Using the same type film, and with negative polarity of the oscilloscope, after five seconds of development, the image was white to blue-green and the background was pale green. After ten seconds, there was only slight change in the color of the image, up to full development at sixty seconds, but the background changed as each successive exposure was permitted to develop for a longer period of time. Thus, at ten seconds, the background became a tan-brown, after fifteen seconds the background was light brown, and after twenty seconds the background was a deeper brown. Permitting further development time in successive exposures resulted in ever deeper browns, until at sixty seconds, the background was a brownish black.

Figure 7:
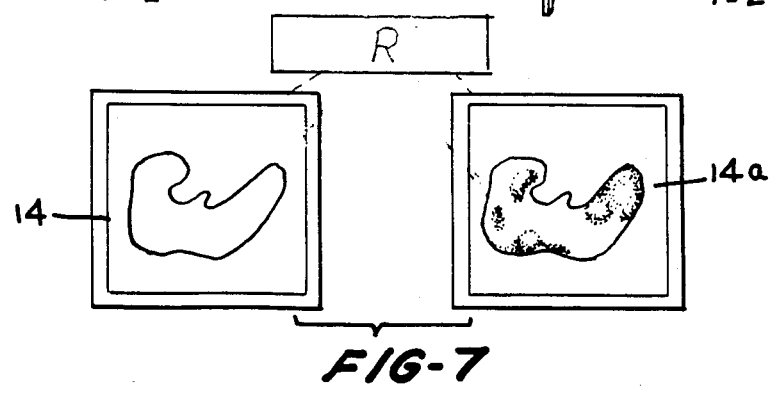
FIG. 7 illustrates the reproduction of one or both of the color prints obtained by the foregoing steps.

Although the above changes in color for both positive and negative polarity have been stated in changes in the time of development at five second intervals, the development time increments may be less or more than that. In practice, it has been found that as many as fifty-six different images, having development times of approximately one second difference may be made with approximately fifty-six different color prints made of the same oscilloscope image.

Where the object 12 is a black and white photograph in a text book, similar changes or color differentiations will result. That is, with lesser development time, the image is primarily in the white, pale blue and blue ranges, whereas with more development time, tan-brown colorations become apparent. This is indicated in FIG. 7 where the film 14 is indicated as having little or faint coloration, and the image on the film 14a will be seen to have greater coloration, the print 14 or 14a or another print having a different time of development which will have been produced by the method illustrated herein. That color photograph of the continuous tone image is deemed to provide greater more readily understood information. The selected color photograph print is then used in a reproduction process R, such as in a color printing process of a book or journal.

It has been found, in comparison to analyzing the information provided by an image such as a black and white print, a continuous tone oscilloscope or X-ray, that the information provided by a print produced by the above-described method enhances the ability of the observer to comprehend and evaluate the information provided by the photograph. Not only is the understanding of the information enhanced, it is also more readily comprehended by the observer, such as a student, trained radiologist or other trained person. Further, it has been found that the lay person is able to perceive and comprehend certain aspects of the image, through consideration of one or more color prints obtained by the present method, in contrast to an inability, for the most part, for such lay persons to comprehend much of the information in the image of a black and white print, a continuous tone oscilloscope, or an X-ray.

It has also been found that some enhancement of the various color prints obtained by the process may be achieved by multiple exposures of the same "print". The effect of this is to cause the darker areas to be darker and the lighter areas to be lighter, other factors being equal. Among those other factors are the brightness of the object photographed, ambient light, temperature, and time of development.

The photoprints produced by the present method are relatively permanent, no fading or alteration of colors having been observed after a period of some months following exposure and development.

There has been provided a method for enhancing the image of a continuous tone object, such as a black and white print, oscilloscope or an X-ray. The method uses inexpensive equipment, including a camera and existing photographic instant color film. Hence, equipment for practicing the present method is readily available and is economical to acquire. The method is not complex, and may be practiced without extensive training. The results produced provide substantially enhanced imaging and improved understanding and comprehension of the data in the object.

It will be obvious to one skilled in the art that various changes may be made without departure from the spirit of the invention, and therefore the invention is not limited to that shown in the drawings, and described in the specification, but only as indicated in the appended claims.

I claim:

1. The method of providing a color photographic image of a continuous tone object comprising:
   (a) providing color film of the type comprising a support and plural emulsions each sensitive to a different color and a separable sheet carrying developer for the emulsions, the development of the said plural emulsions being in timed sequence after activation of the developer,
   (b) exposing a continuous tone object onto said color film,
   (c) initiating the activation of the developer, and
   (d) separating said separable sheet from said emulsions prior to full development to thereby stop development and to obtain a print of color different than a fully developed print.

2. The method of claim 1, and further comprising reproducing the resulting photographic image with coloration substantially the same as that of said resulting photographic image.

3. The method of claim 1, wherein the continuous tone object is a black and white photograph.

4. The method of claim 3, and further comprising reproducing the resulting photographic image with coloration substantially the same as that of said resulting photographic image.

5. The method of claim 1, wherein the continuous tone object is a reproduction of a photographic image.

6. The method of claim 5, and further comprising reproducing the resulting photographic image with coloration substantially the same as that of said resulting photographic image.

7. A method of producing a color photograph from a continuous tone object comprising:
   (a) photographing a continuous tone object with instant color film which includes plural sequentially developable color emulsions on a support and developer carried on a separable sheet by exposing said emulsions to said object,
   (b) thereafter initiating development of at least one said emulsion by activation of said developer, and
   (c) removing said separable sheet from said emulsions and support prior to the development of all of said emulsions, whereby to obtain a color photograph of said object which has color different than a fully developed color photograph thereof.

8. The method of claim 7, and thereafter reproducing the color photograph.

* * * * *